(12) United States Patent
Moeller et al.

(10) Patent No.: US 9,776,597 B2
(45) Date of Patent: *Oct. 3, 2017

(54) VEHICLE WITH ELECTRONIC SYSTEM INTRUSION DETECTION

(71) Applicant: LEAR CORPORATION, Southfield, MI (US)

(72) Inventors: Douglas S Moeller, Santa Rosa, CA (US); Ronald W Pashby, San Francisco, CA (US); Daniel J Obrien, Grand Blanc, MI (US); John M Merritt, Rochester, MI (US); Stephan A Tarnutzer, Shelby Township, MI (US)

(73) Assignee: LEAR CORPORATION, Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/278,890

(22) Filed: May 15, 2014

(65) Prior Publication Data

US 2014/0247122 A1 Sep. 4, 2014

Related U.S. Application Data

(63) Continuation-in-part of application No. 12/514,047, filed as application No. PCT/US2007/011632 on May 15, 2007, now Pat. No. 8,817,599.

(60) Provisional application No. 60/800,749, filed on May 16, 2006, provisional application No. 60/800,679, (Continued)

(51) Int. Cl.
*B60R 25/10* (2013.01)
*G06F 21/55* (2013.01)
*H04L 29/06* (2006.01)
*H04L 12/24* (2006.01)
*H04L 12/40* (2006.01)

(52) U.S. Cl.
CPC ............ *B60R 25/10* (2013.01); *G06F 21/554* (2013.01); *H04L 12/40* (2013.01); *H04L 41/06* (2013.01); *H04L 63/1425* (2013.01); *H04L 2012/40273* (2013.01)

(58) Field of Classification Search
CPC ............. H04L 63/1408; H04L 63/1425; H04L 63/1441; H04L 41/06; B60R 25/10; G06F 21/554

See application file for complete search history.

(56) References Cited

U.S. PATENT DOCUMENTS 5,606,315 A * 2/1997 Gaskins ................. G06F 21/31 324/378
8,903,593 B1 * 12/2014 Addepalli et al. ........... 701/29.1
2002/0105417 A1 * 8/2002 Gillis et al. .................. 340/426

(Continued)

*Primary Examiner* — Edan Orgad
*Assistant Examiner* — Jeremy Costin
(74) *Attorney, Agent, or Firm* — Donald J Lenkszus

(57) ABSTRACT

In an embodiment of a vehicle, the vehicle comprises: a vehicle network bus; one or more electronic control units coupled to the bus. One electronic control unit comprises: a processor; a memory; an interface to the vehicle network bus; and an intrusion detection program stored in the memory and executable by the processor. The processor utilizes the interface to monitor data on the vehicle network bus and utilizes the intrusion detection program to detect one or more anomalies in the monitored data. The electronic control unit generates an alert upon detection of one or more anomalies.

17 Claims, 11 Drawing Sheets

Related U.S. Application Data filed on May 16, 2006, provisional application No. 60/800,750, filed on May 16, 2006.

(56) References Cited

U.S. PATENT DOCUMENTS

| | | | |
|---|---|---|---|
| 2014/0115403 A1* | 4/2014 | Rhee et al. | 714/38.1 |
| 2014/0226673 A1* | 8/2014 | Hirashima | H04L 12/40006 370/401 |
| 2015/0032976 A1* | 1/2015 | Chapier | G06F 12/1491 711/152 |
| 2015/0113638 A1* | 4/2015 | Valasek et al. | 726/22 |

* cited by examiner

VEHICLE WITH ELECTRONIC SYSTEM INTRUSION DETECTION

CROSS-REFERENCE TO RELATED APPLICATIONS

The present application is a continuation-in-part of U.S. patent application Ser. No. 12/514,047 filed as PCT Application No. PCT/US07/11632 filed on May 15, 2007 and claiming priority to U.S. provisional application Ser. No. 60/800,749, filed May 16, 2006, U.S. provisional application Ser. No. 60/800,679, filed May 16, 2006 and claiming priority to U.S. provisional application Ser. No. 60/800,750, filed May 16, 2006. The disclosure of Ser. No. 12/514,047 is incorporated herein by reference.

FIELD

The present invention relates to detecting unauthorized access to vehicular computer control systems.

BACKGROUND

As the Automotive industry moves towards connected cars and autonomous vehicles, "car hacking" or placing malware onto vehicle electronics control systems is becoming a growing concern for auto manufactures. Such unauthorized access is referred to as an "intrusion". The methodology of detecting unauthorized access to computer networks or systems is referred to as "intrusion detection."

While new security architectures are being developed for newer cars, these architectures will take years to implement and won't apply to vehicles already built and being built for some time.

It is desirable to provide a system and method for detecting such an intrusion for vehicles that do not have security architectures or to detect intrusions for those vehicles that do have intrusion prevention architectures when such prevention fails.

SUMMARY

In accordance with the principles of the invention a security arrangement is provided that can be used on current vehicle architectures to monitors critical elements of the vehicle and provide alerts when a vehicle has been compromised minimizing the risk of successful "car hacking".

An electronic control unit is provided for installation in a vehicle. The electronic control unit is operable to provide intrusion detection for the vehicle electronics. The electronic control unit comprises: a processor; a memory; and an interface to a vehicle network bus coupled to vehicle electronic control units. The processor utilizes the interface to monitor data on the vehicle network bus. An intrusion detection program is stored in the memory and is executable by the processor. The processor utilizes the intrusion detection program to detect one or more anomalies in the monitored data. The electronic control unit generates an alert upon detection of one or more anomalies.

The intrusion detection program may comprise statistical anomaly detection.

The intrusion detection program may further comprise and utilize Bayes' Law.

The alert generated by the electronic control unit may be transmitted to one or more of a man-machine interface in the vehicle, a remotely located device, a mobile device, or a server.

In various embodiments of the electronic control unit, the vehicle network bus comprises a Controller Area Network (CAN) bus.

In various embodiments of the electronic control unit, the statistical anomaly detection may utilize a profile of normal data on the vehicle bus based upon learned data. The normal data may comprise one or more of an amount of normal traffic, identification of normal messages, identification of normal vehicle device-to-device communication, and identification of normal sensor data.

In another embodiment of the electronic control unit, the intrusion detection program comprises specification based anomaly detection. The intrusion detection program ignores all specification compliant data on the vehicle network bus and generates an alert for data on the vehicle network bus that is not specification compliant.

The electronic control unit may be operable to receive at least one of calibration information and update information for the intrusion detection program.

In one embodiment of the electronic control unit, specification-based anomaly detection is utilized to detect one or more of acceleration patterns, braking patterns, original equipment manufacturer (OEM) provided patterns, counterfeit airbags, spoofing of vehicle bus messages and/or identifications, and invalid bus identifications.

In an embodiment, the electronic control unit comprises an anomaly detection engine. The anomaly detection engine may comprise one of statistical anomaly detection and specification based anomaly detection.

In the various embodiments of the electronic control unit, the anomalies may comprise one of re-flashing of an electronic control unit memory, and predetermined radio frequency hub activity in the vehicle.

An embodiment is provided of a mobile router for installation in a vehicle comprising a vehicle network bus coupled to a plurality of electronic control units. The mobile router comprises: a processor; a memory comprising a plurality of programs; a wireless wide area network interface; a wireless local area network interface; and an interface to the vehicle network bus coupled to vehicle electronic control units. The processor utilizes the interface to monitor data on the vehicle network bus. The plurality of programs comprises an intrusion detection program executable by the processor to detect one or more anomalies in the monitored data; and to generate an alert upon detection of one or more anomalies.

In the embodiment of the mobile router, the intrusion detection program is isolated from the other programs stored in the memory. In the embodiment, the memory comprises a first memory portion comprising the intrusion detection program and a second memory portion comprising the other programs.

In one embodiment of the mobile router, the intrusion detection program comprises statistical anomaly detection. The intrusion detection program may comprise Bayes' Law. The statistical anomaly detection utilizes a profile of normal data on the vehicle bus based upon learned data. The normal data comprises one or more of an amount of normal traffic, identification of normal messages, identification of normal vehicle device-to-device communication, and identification of normal sensor data.

In the embodiment, the mobile router transmits the alert to one of a man-machine interface in the vehicle, a mobile device, and a server. The mobile router may transmit the alert via a selected one of the wide area network interface and the local area network interface to one of a mobile device and a server.

In one embodiment of the mobile router, the vehicle network bus comprises a Controller Area Network (CAN) bus.

In another embodiment of the mobile router, the intrusion detection program comprises specification based anomaly detection. The intrusion detection program ignores all specification compliant data on the vehicle network bus and generates the alert for data on the vehicle network bus that is not specification compliant.

In an embodiment of the mobile router, the wireless wide area network interface and the wireless local area network interface area selectively operable to receive at least one of calibration information and update information for the intrusion detection program.

In the embodiment, the mobile router transmits the alert to one of a man-machine interface in the vehicle, a mobile device, and a server. The mobile router may transmit an alert via a selected one of the wide area network interface and the local area network interface to one of a mobile device and a server.

The specification-based anomaly detection of the embodiment of the mobile router may be utilized to detect one or more of acceleration patterns, braking patterns, original equipment manufacturer (OEM) provided patterns, counterfeit airbags, and invalid bus identifications.

The wireless wide area network interface and the wireless local area network interface of the mobile router are selectively operable to receive at least one of calibration information and update information for the intrusion detection program.

In the embodiment of the mobile router, the intrusion detection program comprises an anomaly detection engine. The anomaly detection engine may comprise one of statistical anomaly detection and specification based anomaly detection. The anomalies detected may comprise one of re-flashing of an electronic control unit memory, and predetermined radio frequency hub activity in the vehicle.

In an embodiment of a vehicle, the vehicle comprises: a vehicle network bus; one or more electronic control units coupled to the bus. One electronic control unit comprises: a processor; a memory; an interface to the vehicle network bus; and an intrusion detection program stored in the memory and executable by the processor. The processor utilizes the interface to monitor data on the vehicle network bus and utilizes the intrusion detection program to detect one or more anomalies in the monitored data. The electronic control unit generates an alert upon detection of one or more anomalies.

In one embodiment of a vehicle, the intrusion detection program may comprise statistical anomaly detection, and, may further comprise Bayes' Law.

The statistical anomaly detection in the vehicle may utilize a profile of normal data on the vehicle bus based upon learned data. The normal data may comprise one or more of an amount of normal traffic, identification of normal messages, identification of normal vehicle device-to-device communication, and identification of normal sensor data.

The vehicle electronic control unit may transmit the alert to one of a man-machine interface in the vehicle, a mobile device, and a server.

In various embodiments of the vehicle, the vehicle network bus may comprise a Controller Area Network (CAN) bus.

In other embodiments of the vehicle, the intrusion detection program comprises specification based anomaly detection. The intrusion detection program ignores all specification compliant data on the vehicle network bus and generates the alert for data that is not specification compliant.

The specification-based anomaly detection may be utilized to detect one or more of acceleration patterns, braking patterns, original equipment manufacturer (OEM) provided patterns, counterfeit airbags, and invalid bus identifications.

In embodiments of the vehicle, the wireless wide area network interface is operable to receive at least one of calibration information and update information for the intrusion detection program.

The electronic control unit transmits the alert to one of a man-machine user interface in the vehicle, a mobile device, and a server.

In various embodiments of the vehicle, the electronic control unit is operable to receive at least one of calibration information and update information for the intrusion detection program.

Various embodiments of a vehicle may comprise an anomaly detection engine. The anomaly detection engine may comprise one of statistical anomaly detection and specification based anomaly detection.

In various embodiments of a vehicle, the anomalies may comprise one of re-flashing of an electronic control unit memory, and predetermined radio frequency hub activity in the vehicle.

A method is provided for vehicle intrusion detection for a vehicle comprising a vehicle network bus and electronic control units coupled to the vehicle network bus. The method comprises providing the vehicle with one electronic control unit comprising: a processor; a memory; and an interface to the vehicle network bus. The method further comprises: operating the electronic control unit to monitor data on the vehicle network bus; storing an intrusion detection program in the memory; operating the processor to execute the intrusion detection program to detect one or more types of anomalies in the monitored data; and operating the electronic control unit to generate an alert upon detection of one or more anomalies.

The method for a vehicle may further comprise utilizing statistical anomaly detection to detect one or more types of anomalies; and may also comprise utilizing Bayes' Law to detect one or more types of anomalies.

The method for a vehicle may further comprise utilizing a profile of normal data on the vehicle bus based upon learned data for statistical anomaly detection; and may further comprise selecting the normal data to be one or more of an amount of normal traffic, identification of normal messages, identification of normal vehicle device to device communication, and identification of normal sensor data.

The method for a vehicle may further comprise operating the electronic control unit to transmit the alert to one of a man-machine interface in the vehicle, a mobile device, and a server.

In one embodiment of the method for a vehicle, the vehicle network bus may comprise a Controller Area Network (CAN) bus.

In other embodiments of the method for a vehicle, the method may comprise utilizing specification based anomaly detection in the intrusion detection program. The method may further comprise: operating the electronic control unit to ignore all specification compliant data on the vehicle network bus; and generating the alert for data on the vehicle network bus that is not specification compliant.

In various embodiments of a method for a vehicle, the electronic control unit may comprise a wireless wide area network interface and the method may comprise receiving at least one of calibration information and update information for the intrusion detection program via the wireless wide area network interface.

The method for the vehicle may further comprise utilizing the specification-based anomaly detection to detect one or more of acceleration patterns, braking patterns, original equipment manufacturer (OEM) provided patterns, counterfeit airbags, spoofing of vehicle bus messages and/or identifications and invalid bus identifications.

The method for the vehicle may further comprise providing the electronic control unit with an anomaly detection engine. The method my yet further comprise selecting the anomaly detection engine to comprise one of statistical anomaly detection and specification based anomaly detection.

In embodiments of the method for the vehicle, the anomalies may comprise one of re-flashing of an electronic control unit memory, and predetermined radio frequency hub activity in the vehicle.

Further embodiments of the invention are directed to a method of operating a mobile router installed in a vehicle. The vehicle comprises a vehicle network bus coupled to a plurality of electronic control units. The mobile router comprises: a wireless wide area network interface a wireless local area network interface; an interface to the vehicle network bus; a processor; and a memory comprising a plurality of programs. The plurality of programs comprises an intrusion detection program executable by the processor.

The method of operating a mobile router comprises: monitoring data on the vehicle network bus; utilizing the intrusion detection program to detect one or more anomalies in the monitored data; and generating an alert upon detection of one or more of anomalies.

The method further may comprise isolating the intrusion detection program from the other of the plurality of programs. The method may comprise storing the intrusion detection program in a first memory portion and storing the other programs in a second memory portion.

The method of operating a mobile router may further comprise utilizing statistical anomaly detection in the intrusion detection program. The method may yet further comprise utilizing Bayes' Law.

The method of operating a mobile router may include transmitting the alert to one of a man-machine interface in the vehicle, a mobile device, and a server. The method may further include transmitting the alert via a selected one of the wide area network interface and the local area network interface to one of a mobile device and a server.

The method of operating a mobile router may further comprise utilizing a profile of normal data on the vehicle bus based upon learned data to detect anomalies. The normal data may comprise one or more of an amount of normal traffic, identification of normal messages, identification of normal vehicle device-to-device communication, and identification of normal sensor data.

In various embodiments, the method of operating the mobile router may comprise utilizing specification based anomaly detection in the intrusion detection program, and further may comprise ignoring all specification compliant data on the vehicle network bus; and generating an alert for data on that is not specification compliant.

In various embodiments, the method of operating the mobile router may comprise utilizing specification-based anomaly detection to detect one or more of acceleration patterns, braking patterns, original equipment manufacturer (OEM) provided patterns, counterfeit airbags, and invalid bus identifications. The method may further comprise receiving at least one of calibration information and update information for the intrusion detection program via a selected one of the wireless wide area network interface and the wireless local area network interface.

In the various embodiments, the method of operating the mobile router may comprise: providing an anomaly detection engine; and utilizing the anomaly detection engine. The method may further comprise selecting the anomaly detection engine to comprise one of statistical anomaly detection and specification based anomaly detection.

In the various embodiments, the method of operating the mobile router may comprise detecting anomalies comprising one of re-flashing of an electronic control unit memory, and predetermined radio frequency hub activity in the vehicle.

A method of operating a predetermined electronic control unit is provided for a vehicle comprising: a vehicle network bus and one or more electronic control units coupled to the bus. The method comprises: providing the predetermined electronic control unit of with a processor, a memory, an interface to the vehicle network bus, and an intrusion detection program. The method further comprises: utilizing the predetermined electronic control unit to monitor data on the vehicle network bus; executing the intrusion detection program to detect one or more anomalies in the monitored data; and utilizing the predetermined electronic control unit to generate an alert upon detection of one or more anomalies.

In the various embodiments, the method of operating a predetermined electronic control unit may comprise utilizing statistical anomaly detection in the intrusion detection program.

In the various embodiments, the method of operating a predetermined electronic control unit may further comprise utilizing Bayes' Law in the intrusion detection program.

In the various embodiments, the method of operating a predetermined electronic control unit may comprise utilizing the predetermined unit to transmit the alert to one of a man-machine interface in the vehicle, a mobile device, and a server.

In the various embodiments, the method of operating a predetermined electronic control unit may comprise utilizing the predetermined unit to transmit the alert to one of the mobile device and the server via the wireless wide area network interface.

In the various embodiments, the method of operating a predetermined electronic control unit may comprise operating the predetermined unit to utilize a profile of normal data on the vehicle bus, the profile of normal data being based upon learned data. The method may comprise selecting the normal data to comprise one or more of an amount of normal traffic, identification of normal messages, identification of normal vehicle device-to-device communication, and identification of normal sensor data.

In the various embodiments, the method of operating a predetermined electronic control unit may comprise providing the intrusion detection program with specification based anomaly detection. The method may further comprise executing the intrusion detection program to ignore all specification compliant data on the vehicle network bus; and operating the predetermined unit to generate the alert for data on the vehicle network bus that is not specification compliant.

In the various embodiments, the method of operating a predetermined electronic control unit may comprise operating the predetermined unit to receive at least one of calibration information and update information for the intrusion detection program via the wireless wide area network interface.

In the various embodiments, the method of operating a predetermined electronic control unit may comprise operating the predetermined unit to utilize specification-based anomaly detection to detect one or more of acceleration patterns, braking patterns, original equipment manufacturer (OEM) provided patterns, counterfeit airbags, and invalid bus identifications.

In the various embodiments, the method of operating a predetermined electronic control unit may comprise providing the predetermined unit an anomaly detection engine. The method may further comprise selecting the anomaly detection engine to comprise one of statistical anomaly detection and specification based anomaly detection. In the various embodiments, the method of operating the vehicle may comprise operating the predetermined unit may comprise selecting the anomalies to comprise one of re-flashing of an electronic control unit memory, and predetermined radio frequency hub activity in the vehicle.

BRIEF DESCRIPTION OF THE DRAWING

The invention will be better understood by reading the following detailed description in conjunction with the drawing figures in which like designators refer to like elements, and in which.

DETAILED DESCRIPTION

Mobile routers are wireless routers that typically permit a mobile device located in a vehicle that to maintain a connection to a wide area network and thereby greatly expand the mobility of the mobile device. Mobile routers are fully operable whether the vehicle having a mobile router installed therein is in motion or stationary. The mobile router may maintain connection to the Internet as it travels across cellular networks.

Figure 1:
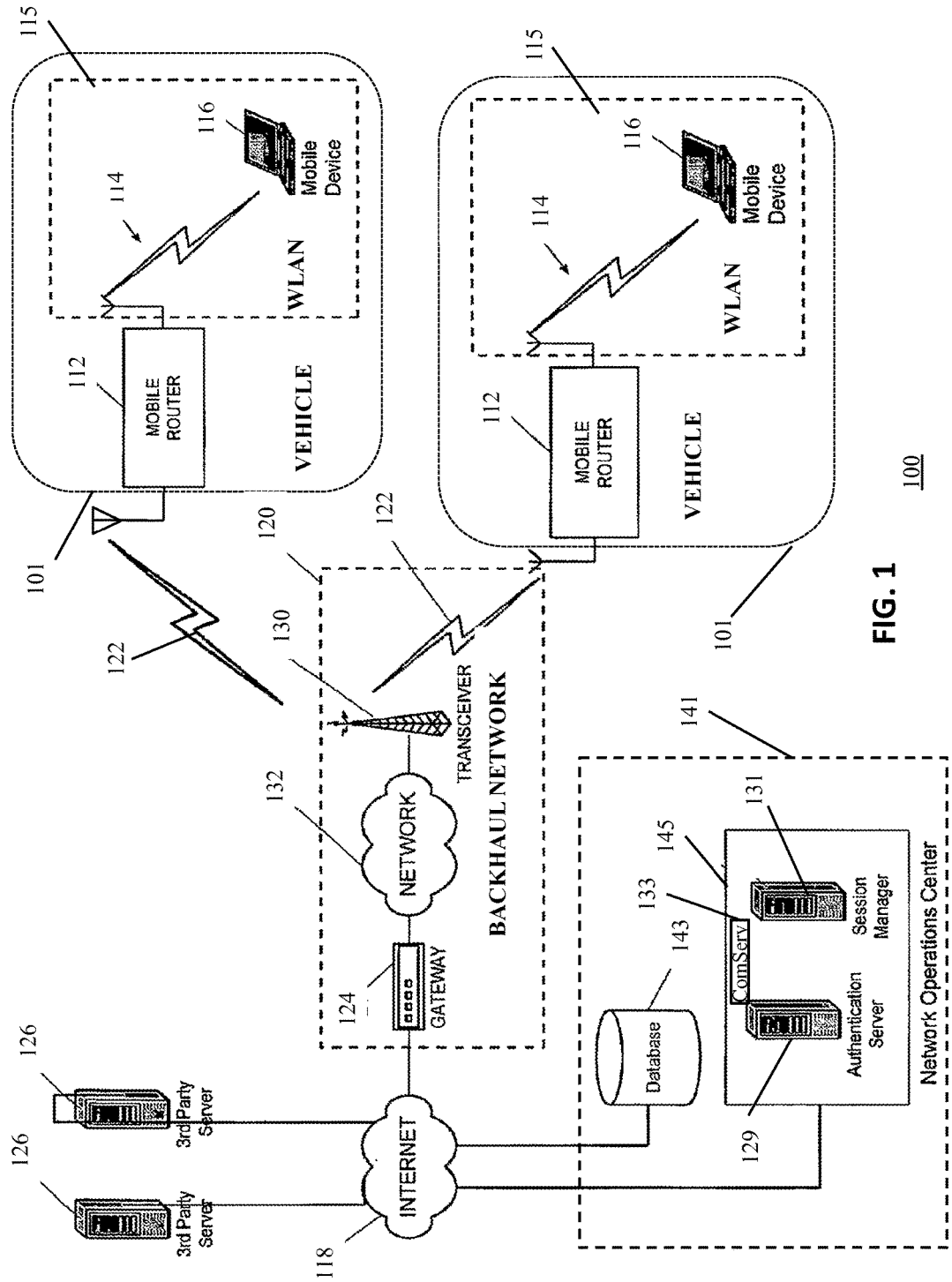
FIG. 1 is a block diagram of a first mobile router network arrangement.

FIG. 1 illustrates a mobile router network 100. Mobile router network 100 comprises a plurality of vehicles 101, each having therein a mobile router 112. Each vehicle 101 includes a wireless local area network 115. Each wireless local area network 115 may be in communication with one or more corresponding mobile devices 116 via a wireless communication link 114. Each wireless local area network 115 includes mobile router 112 and may or may not include one or more mobile devices 116. Each wireless local area network 115 may be, for example, a network compliant with industry standard IEEE 802.11 network, i.e., a Wi-Fi network, or a network compliant with industry standard IEEE 802.16, i.e., a WiMAX network, or a Bluetooth network, or any other suitable wireless network.

Each mobile device 116 may be any processor based device having a wireless transceiver capable of receiving and transmitting data via the wireless communication link 114. For example, one mobile device 116 may be a laptop (or notebook) computer equipped with a wireless network interface card, a wireless-enabled PDA, a pocket or palmtop computer, a Wi-Fi phone (e.g., a Skype phone or VoIP phone), a Wi-Fi appliance, a Sony PlayStation PSP or some other portable, network-enabled gaming station, a video screen, a digital camera, an audio player, a navigation device, a security camera, an alarm device, a wireless payment or POS device, or an automotive electronic device.

Mobile router 112 may act as a gateway between wireless network 115 and a backhaul network 120. In one embodiment, backhaul network 120 is a cellular wireless network. Backhaul network 120 in turn may be connected to the Internet 118 or any other network, such as an intranet or another WAN, via a gateway 124.

Mobile router 112 communicates with the backhaul network 120 via a backhaul wireless communication link 122. Backhaul wireless communication link 122 may be provided by a wireless network that is part of the backhaul network 120, such as a cellular wireless network. The cellular wireless network may be of any type.

Examples of such types of cellular network, include but are not limited to the following types: a Global System for Mobile Communications/General Packet Radio Service (GSM/GPRS) link; a UMTS (Universal Mobile Telecommunications System) link; a Code Division Multiple Access (CDMA) link; an Evolution-Data Optimized (EV-DO) link; an Enhanced Data Rates for GSM Evolution (EDGE) link; a 3GSM link; a Digital Enhanced Cordless Telecommunications (DECT) link; a Digital AMPS (IS-136/TDMA) link; an Integrated Digital Enhanced Link (iDEN) link; a WiMAX link; or any other suitable wireless link.

Each mobile router 112 and its corresponding mobile device 116 are co-located in a vehicle 101 so that mobile router 112 is capable of being mobile and operable to establish connectivity whether mobile or stationary such that each end-user of a mobile device 116 can enjoy wireless connectivity to Internet 118 via mobile router 112 as the vehicle travels through cells or nodes associated with wireless network 122. Vehicle 101 may be any type of vehicle that travels over and/or under land, over and/or under water, or in the air or space. The typical most common type of vehicle 101 that is likely to include a mobile router is a car, truck, or bus.

Each mobile router 112 may be mounted in a corresponding vehicle 101 in a secure and generally tamper-resistant location. For example, the mobile router 112 may be mounted in the trunk of an automobile, and the end-user of the mobile device 116 may be a passenger or driver of the automobile. That way, the end-user could enjoy wireless connectivity as the automobile moves between cells of the wireless network 122.

Although only one mobile device 116 is shown in communication with each mobile router 112 shown in FIG. 1, numerous mobile devices 116 may be in communication with a corresponding mobile router 112 via the corresponding local area network 115.

Cellular network cell site transceiver 130 may be used to provide a cellular link to mobile router 112 and both receive and transmit wireless signals to a mobile router 112 via one of the wireless cellular communication links 122. A cellular communication network 132 of cellular backhaul network 120 may communicate via the worldwide web or Internet 118 or another network via one or more gateways 124. Each communication network 132 may include conventional communication network elements to provide wireless cellular network service for each mobile router 112.

Each vehicle 101 includes a vehicle network bus 591 that is more fully described herein below. Each mobile router 112 is coupled to its corresponding vehicle's vehicle network bus 591

Figure 2:
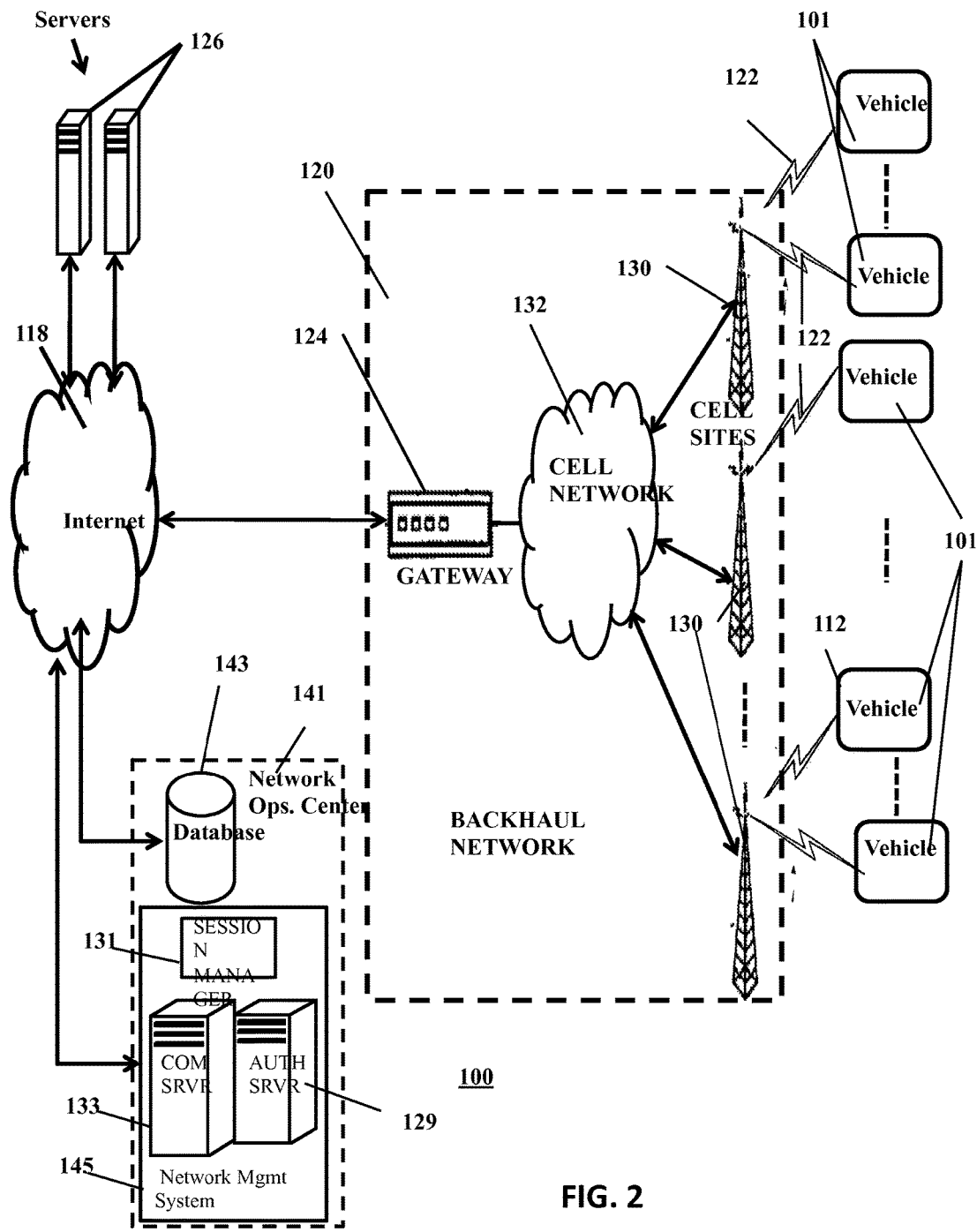
FIG. 2 is a block diagram of an expanded mobile router network arrangement.

Turning now to FIG. 2, mobile router network 100 is shown in a more expanded networked arrangement in which cellular backhaul network 120 is shown as having a plurality of cell site transceivers 130, each of which can communicate with one or more vehicles 101 having a mobile router 112 therein. FIG. 2 shows one gateway 124 to Internet 118, but it will be appreciated that there may be a plurality of such gateways 124, each of which may have access to the Internet 118 or to another network.

Figure 3:
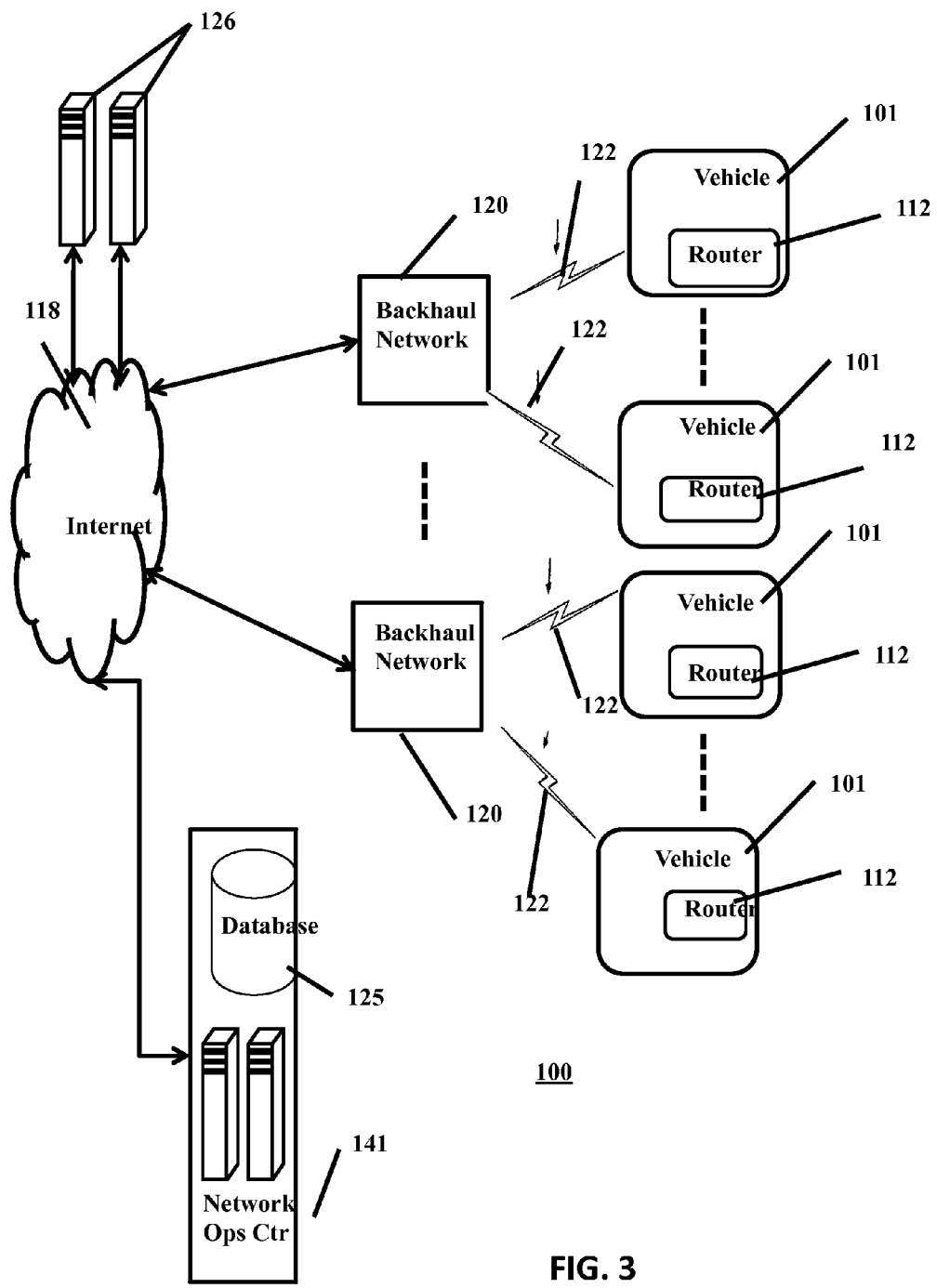
FIG. 3 is a block diagram of a further expanded mobile router network arrangement.

Turning now to FIG. 3, mobile router network 100 is illustrated in further expanded form to show that in which there may be a plurality of cellular backhaul networks 120 each comprising a number of cell site transceivers, each located in different areas serviced by the backhaul networks 120, such that each mobile router 112 may stay in communication with a backhaul network 120 as each mobile router 112 moves between cells or nodes of the backhaul networks 120. It will be appreciated by those skilled in the art, that there is virtually no limit to the size of mobile router network 100.

Each of FIGS. 1 through 3 shows that mobile router network 110 comprises at least one network operations center 141. Network operations center 141 comprises a database 143 and a network management system 145. Network management system 145 is a combination of hardware and software used to monitor and administer or otherwise manage mobile router network 100. Each mobile router 112 is managed as an individual network element.

Network management system 145, comprises an authentication server 129, a session manager 131, and a communication server 133. Communication server 133 is a combination of hardware and software used to manage communications between mobile routers 120, and network management system 145.

Figure 4:
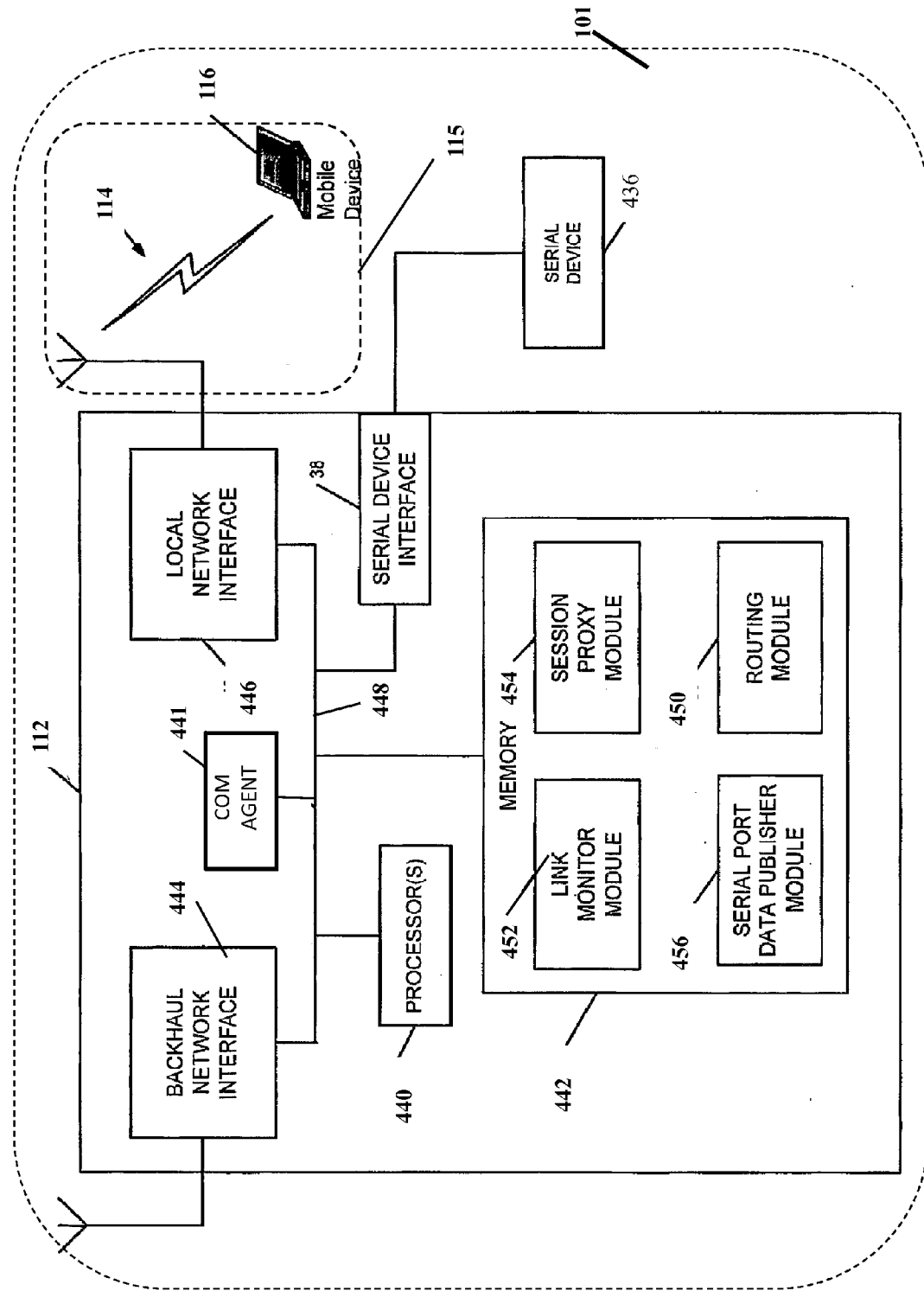
FIG. 4 is a block diagram of a mobile router.

FIG. 4 is a simplified block diagram of a mobile router 112 situated in a vehicle 101. Mobile router 112 comprises processor 440, one or more memory units 442, a backhaul network interface or wide area network interface or cellular network interface 444, and a local network interface 446. A system bus 448 interconnects processor 440, memory units 442, backhaul network interface 444 and local network interface 446.

Backhaul or cellular network interface 444 interfaces with and provides a wireless communication link with backhaul or cellular network 120 via cell site transceiver 130. Backhaul or cellular network interface 444 may interface with one or more types of wireless cellular communication links 122. For example, the backhaul cellular network interface 444 may interface to any one or more of: a Global System for Mobile Communications/General Packet Radio Service (GSM/GPRS) link; a UMTS (Universal Mobile Telecommunications System) link; a Code Division Multiple Access (CDMA) link; an Evolution-Data Optimized (EV-DO) link; an Enhanced Data Rates for GSM Evolution (EDGE) link; a 3GSM link; a Digital Enhanced Cordless Telecommunications (DECT) link; a Digital AMPS (IS-136/TDMA) link; an Integrated Digital Enhanced Link (iDEN) link; a WiMAX link; or any other suitable wireless link.

Local area network interface 446 interfaces and provides a wireless communication link 114 with wireless local area network 115. Similarly, local network interface 446 may interface to one or more types of wireless network links 114 such as a Wi-Fi, WiMAX, or Bluetooth link.

Processor 440 may execute various programs or instruction code stored in memory 442. Memory 442 may comprise one or more types of computer-readable media. As such, memory 442 may comprise one or more memory chips, optical memory devices, magnetic memory devices, or other memory devices.

Various programs or program modules are executable by processor 440. The program modules include a routing module 450, a link monitor module 452, a session proxy module 454, and a serial port data publisher module 456. The program modules 450, 452, 454, 456 may be stored in portions of memory 442 or in one or move separate memories.

Routing module 450 is executed by processor 440 to route data packets between wireless network 415 and backhaul or cellular network 420. Link monitor program 452 monitors cellular communication links 122 (layer 2) and also Internet communication links (layer 3) via backhaul or cellular network 120 by sending test or probing data packets and monitoring for responses thereto. By monitoring the sending and receiving of test packets and responses, processor 440 executing link monitor program 452 detects if either (or both) of cellular communication link or Internet 118 link fails.

When processor 440, executing link monitor module 52, detects a drop-off, the dropped link is automatically reestablished to minimize the interruption in service to the end user.

In many prior art mobile routers, when communications links are lost, the end-user's applications and network sessions are terminated. The end-user has to restart the applications and/or session when the communications links and network connection are reestablished.

When processor 440 detects a failure in one or both of the communications link 122 or Internet 118 link, processor 440 initiates remedial action by attempting to reestablish the link or links. Processor 440 may reestablish the link before any applications on the corresponding mobile device 116 have to be restarted. That way, the user does not have to restart the applications or sessions. The user just typically notices that the applications/sessions slowed for a brief period of time while the connection was being reestablished.

Link monitor module 452 as executed on processor 440 provides adaptive programming. If backhaul or cellular network interface 44 receives data packets over backhaul wireless communication link 122, processor 440 sends fewer probing test data packets. Conversely, if backhaul or cellular network interface 444 does not receive data packets, processor 440 sends more probing test data packets. By monitoring data packets received via backhaul or cellular network interface 444, processor 440 determines that the interface is functioning. Accordingly, processor 440 sends data test packets less frequently.

Processor 440, executing link monitor module 452, monitors backhaul network interface 444 to determine that data packets are received. If processor 440 determines that backhaul wireless communication link 122 is working, then processor 440 sends fewer active probes on the backhaul or cellular network 120.

Processor 440, by executing session proxy module 454 acts as a session proxy for all TCP sessions going through mobile router 112. When a mobile device 116 seeks to establish a TCP session with a destination such as a third party server 126 coupled to Internet 118, 440 terminates the TCP session coming from mobile device 116 and, instead, establishes a TCP session via backhaul network interface 444 with the destination. Mobile router 112 also maintains a separate TCP session with mobile device 116 via local wireless communication link 114.

All end-user traffic between mobile device 116 and the destination is transparently routed through mobile router 112 during the two separate sessions. If one session such as the backhaul wireless communication link 122 goes down that does not negatively affect the session between the mobile router 112 and mobile device 116. As a result, processor 440, executing session proxy program module 454, maintains a TCP session to mobile device 116. If applications running on mobile device 116 are dependent upon a TCP session, the applications may continue to run because there is a TCP session with the mobile router 112, even though the TCP session over the backhaul or cellular wireless communication link 122 is lost. When communications via backhaul or cellular communication link 122 are reestablished, mobile device 116 is able to keep running its applications and session without having to restart the applications.

When communication over backhaul network or cellular communication link 122 is interrupted, processor 440, executing session proxy program module 454, prevents the TCP session for wireless communication link 114 to mobile device 116 from starting its back-off timers. Under TCP protocol, mobile device 116 would normally assume that it cannot forward packets because of network congestion and it would accordingly start to slow down the session. In contrast, processor 440, executing session proxy module 454, maintains a TCP session between mobile router 112 and mobile device 116. Mobile 116 device does not assume that network congestion is a problem and the TCP session between mobile router 112 and mobile device 116 does not slow down.

Execution of session proxy module 454 by processor 440 may be disabled by mobile device 116 via a control panel for mobile router 112 displayed on mobile device 116. A user can disable execution of session proxy program module 454 when the user wants to maintain a TCP session with the destination.

Processor 440 when executing serial port data publisher module 456 makes data received from a serial device 436 connected to a serial port 438 available via mobile router 112 as a TCP stream or as some other type of data stream, such as HS-TCP or SCPS data stream. A remote database 125, as shown in FIG. 1 may be populated with the data from device 436 via backhaul or cellular network 120 and Internet 118 so that data from serial device 436 can be remotely accessed via the Internet 118.

Serial device 436 may communicate with mobile router 112 using any suitable serial data protocol, including the USB (Universal Serial Bus) standard, the RS-232 standard, the RS-485 standard, or the IEEE 1394 (FireWire) standard, for example.

Serial device 436 may be any suitable type of serial device, such as, for example, a GPS receiver. Other types of serial data devices 436 may be used. Serial device 436 may be a vehicle telematics device that captures data regarding the performance and operation of the vehicle (e.g., diagnostic data) in which the device is installed. Serial device 436 may be a point-of-sale (POS) device that captures sale or payment information.

Serial data device 436 may also be a remote control for an in-car entertainment system that enables downloading music, video, games, etc., to third party systems or a device for interfacing to communication systems.

Rather than transmitting the data to a central server, e.g., database 125 shown in FIG. 1, a remote user could access mobile router 112 to access the data from serial device 436 directly. In one embodiment, an authenticated remote user could access an authentication server 123 as shown in FIG. 1 to determine the address of a specific one mobile router 112. The remote user could then use that address to communicate with mobile router 112 directly. Similarly, a local end-user of the mobile router 112 could access the data from the serial device via the local wireless network 114.

Processor 440 can output data and command signals via serial interface 438 to serial device 436. Utilizing serial interface 438, processor 440 may activate and control various components and/or systems of a vehicle 101. Serial device 436 may be able to shut of the vehicle engine, unlock the doors, activate alarm functions, etc. Serial device 436 may also, according to various embodiments, perform payment functions, download data, receive advertising, entertainment, gaming, and/or information, as well as perform network management and control.

Each mobile router 112 in the embodiment includes a communication agent 441. Communication agent 441, in the embodiment shown, is a program executed by processor 440, but in other embodiments, communication agent 441 may be a separate processor and program. Communication agent 441 cooperatively operates with communication server 133 shown in FIG. 1.

Processor 440 of each mobile router 112 has the ability to run applications that can perform functions and collect data independently of whether or not mobile router 112 is linked to network management system 120.

Each mobile router has associated with it a specific identifier that is maintained in database 145. The specific identifier can be any unique identifier such as a router serial number or a vehicle identification number. Network operations center 141, utilizing communication server 133, is capable of selectively communicating with each mobile router 112.

Advantageously, the selective communication between each mobile router 112 and network operation center 141 permits the downloading of application programs 565 to each of mobile routers 112 for storage in memory 442 on a selective basis, the communication of data obtained from each router 112 as a consequence of execution of a downloaded application program, and/or the communication of statistical information obtained in or by a mobile router as a result of execution of an application program.

In addition, network operation center 141 is operable to facilitate the downloading of application programs ordered by each mobile router 112 directly or indirectly from third party servers 126.

Network operations center 145 also sends predetermined commands to specific predetermined specific mobile routers 112 for immediate execution or for execution at a predetermined specified interval.

Figure 5:
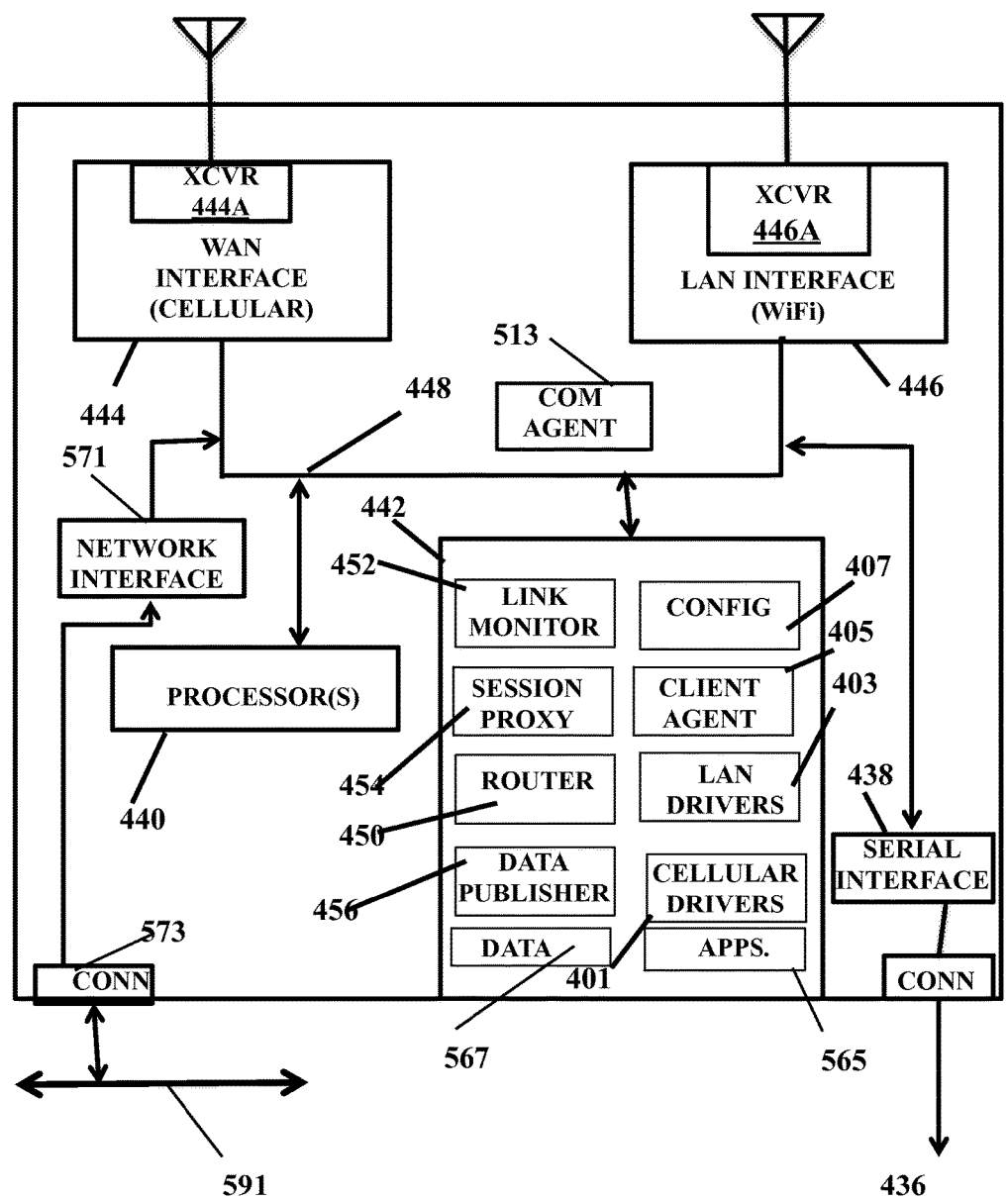
FIG. 5 is a more detailed block diagram of the mobile router of FIG. 4.

As shown in FIG. 5 each mobile router 112 stores application programs in memory 565. Each mobile router 112 is operable to collect data utilizing application programs 565 as well as from interfaces to the vehicle in which mobile router 12 is installed and/or from peripherals 430 coupled to mobile router 112 via serial data interface 438 and/or from mobile device 16. The collected data is marked with a timestamp and stored in memory 442 of mobile router 112. Depending on the nature of the data, mobile router 112 may process the data and prepare the resulting processed data for upload or mobile router 112 may prepare the data immediately for upload to network management system 120. In accordance with one embodiment, the data may be provided by a telematics device or devices.

In certain embodiments, each vehicle 101 includes a vehicle network bus 591 that typically utilizes a standardized protocol over which data or commands may be communicated with various sensors, nodes, processors and other vehicular apparatus coupled to the vehicle network bus.

Vehicle network bus 591 is a specialized internal communications network that interconnects components inside a vehicle (e.g. automobile, bus, train, industrial or agricultural vehicle, ship, or aircraft). Special requirements for vehicle control such as assurance of message delivery, assured non-conflicting messages, assured time of delivery as well as low cost, EMF noise resilience, redundant routing and other characteristics are met with the use of various standardized networking protocols.

Standardized vehicle network bus protocols include Controller Area Network (CAN), Local Interconnect Network (LIN) and others.

Vehicle network bus 591 provides access to the various vehicle electronic control modules in the vehicle. Some of the typical electronic modules on today's vehicles are the Engine Control Unit (ECU), the Transmission Control Unit (TCU), the Anti-lock Braking System (ABS) and body control modules (BCM).

A vehicle electronic control module typically gets its input from sensors (speed, temperature, pressure, etc.) that it uses in its computation. Various actuators are used to enforce the actions determined by the module (turn the cooling fan on, change gear, etc.). The electronic control modules need to exchange data among themselves during the normal operation of the vehicle. For example, the engine needs to tell the transmission what the engine speed is, and the transmission needs to tell other modules when a gear shift occurs. This need to exchange data quickly and reliably led to the development of vehicle network bus 591. Vehicle network bus 591 is the medium of data exchange.

Vehicle network bus 591 is utilized to create a central network in the vehicle 101. Each electronic control modules is 'plugged' into the network and can communicate with any other electronic control module installed on the network via vehicle network bus 591. Each electronic control module controls specific components related to its function and communicates with the other modules as necessary, using a standard protocol, over the vehicle network bus Each mobile router 112 includes a vehicle network bus interface 571 and a connector 573 that connects to the vehicle network bus 591 of vehicle 101. Vehicle network bus 591 is coupled to various vehicle electronic control units 593.

As used herein, an electronic control unit (ECU) is any embedded system that controls one or more of the electrical system or subsystems in a vehicle. Types of ECU include electronic/engine control module (ECM), powertrain control module (PCM), transmission control module (TCM), brake control module (BCM or EBCM), central control module (CCM), central timing module (CTM), general electronic module (GEM), body control module (BCM), suspension control module (SCM), control unit, or control module. One module assembly may incorporate several of the individual control modules. Each ECU typically includes a microcontroller and memory. The memory is typically SRAM, EEPROM or flash memory. The memory contains embedded software to control operation of the ECU.

In one embodiment, a vehicle 101 comprises a vehicle network bus 591 and a mobile router 112. Mobile router 112 comprises a local area network interface 446 comprising a first wireless transceiver 446A of a first predetermined type to provide a link 114 to first a local area network 114 and a wide area network interface 444 comprising a second wireless transceiver 444A of a second predetermined type to provide a link 122 to a wide area network 122. The embodiment further comprises processor 440 to control operation of the local area network interface 446 and the wide area network interface 444. One of the wide area network interface 444 and the local area network interface 446 is selectively operable to establish a wireless communication link with network management system 141 comprising a communication server 133. Each mobile router 112 further comprises a communication agent 513, and an application 565 executable by the 440 to selectively acquire predetermined data from the vehicle network bus 591. Communication agent 513 is operable to upload the predetermined data obtained from vehicle network bus 591 to network management system 141 of FIGS. 1, 2, 3.

Processor 440 is operable to acquire the predetermined data during time periods that wide area network interface 444 is not communicating with network management system 141. Communication agent 513 is operable to upload the predetermined data to network management system 141 upon occurrence of a predetermined event.

The predetermined event may comprise a predetermined time period that may be the time wide area network interface 444 is in communication with network management system 141 and/or the predetermined event is determined by the predetermined data, such as, for example, data that indicates deployment of an air bag.

Mobile router 112 stores the predetermined data in memory 567.

Processor 440 provides a time stamp for the predetermined data at the time the predetermined acquired data is acquired. The time stamp is stored in memory 567 in association with the corresponding predetermined data.

Processor 440 is operable to assign a priority for the predetermined data; and is operable to execute a predetermined action to take with the predetermined data.

Processor 440 is operable to initiate immediate upload of the predetermined data to network management system 141 of the predetermined data having a predetermined one assigned priority. By way of non-limiting example, data indicating deployment of air bags would be assigned a priority for immediate upload.

Processor 440 is operable to control upload of predetermined data having a first predetermined one assigned priority at a first data rate. Processor 440 is operable to control upload of second predetermined data having a predetermined second assigned priority at a second predetermined data rate, the second predetermined data rate being slower than the first predetermined data rate.

Communication agent 513 is operable to determine if uploading of the predetermined data is interrupted. Communication agent 513 is operable in cooperation with the communication server 133 to restore uploading of the predetermined data to network management system 141 from the point of interruption when a communication link between the network management system 141 communication server 133 and the communication agent 513 is restored.

Processor 440 is operable to process the predetermined data prior to the data being uploaded; and processor 440 is operable to store the processed predetermined data as the predetermined data in memory 567.

A time stamp is generated for the predetermined data when it is acquired. The time stamp is stored in memory 567 in association with the corresponding processed predetermined data.

Communication agent 513 may be further operable to determine when uploading occurs in cooperation with the application program or programs 565.

The predetermined data may comprise statistical data and/or diagnostic data. The diagnostic data is obtained via the vehicle network bus interface 571. Processor 440 is operable to process the diagnostic data to generate message data. Communication agent 513 is operable to upload the message data to network management system 141 via one of the local area network interface 446 and the wide area network interface 444.

In various embodiments, the application or applications 565 is or are downloaded to the vehicle via one of the wide area network interface 444 and the local area network interface 446.

As pointed out hereinabove, with the advent of extensive use of ECU, one concern is "car hacking" or placing malware onto the vehicle's electronics control system. One typical method of "car hacking" is to reprogram of "re-flash" the ECU program memory to program malware into the vehicle system. As used in this application the term "re-flash" is understood to mean the reprogramming of ECU program memory regardless of the type of memory.

Memory 442 includes vehicular intrusion detection program 599. Intrusion detection program 599 is executed by one or more of processors 440.

Processor 440 executing intrusion detection program 599 utilizes network interface 571 to monitor data on vehicle network bus 591. Processor 440 executing intrusion detection program 599 operates to detect one or more anomalies in monitored network bus data. Upon detecting an anomaly, processors 440 generate an alert.

Intrusion detection program 599 is isolated from the other programs stored in memory 442. Memory 42 comprises a first memory portion 597 that contains intrusion detection program 599 and a second memory portion 595 comprising the other programs. By providing first memory portion 597 and second memory portion 595, intrusion detection program may be isolated from the other programs utilizing various memory isolation approaches that insure the integrity of the intrusion detection program 599.

In a first embodiment, intrusion detection program 599 comprises statistical anomaly detection and may utilize Bayes' Law. Bayes' Law is also referred to as Bayes' Theorem or Bayes' Rule and is well known to those skilled in the art of statistics.

The statistical anomaly detection provided by intrusion detection program 599 may utilize a profile of normal data on the vehicle bus based upon learned data. The normal data comprises one or more of an amount of normal traffic on vehicle network bus 591, identification of normal messages on vehicle network bus 591, identification of normal vehicle device-to-device communication over vehicle network bus 591, and identification of normal sensor data transmitted over vehicle network bus.

When one or more processors 440 executing intrusion detection program 599 detects an anomaly in data, messages, communications or sensor data transmitted on vehicle network bus 591, mobile router 112 generates an alert and transmits the alert to one of a man-machine interface in the vehicle via vehicle network bus 591 or serial interface 438 or LAN interface 446, and/or to a mobile device such as mobile device 116 via LAN interface 446 or to another mobile device such as a cell phone via backhaul network interface 444, and/or to a server accessed via backhaul network interface 444 or LAN interface 446. The mobile router may transmit the alert via a selected one of the wide area network interface and the local area network interface to one of a mobile device and a server.

In another embodiment, intrusion detection program 599 comprises specification based anomaly detection. In this embodiment, processor 440 executing intrusion detection program 599 ignores all specification compliant data on vehicle network bus 591 and generates an alert for data on vehicle network bus 591 that is not specification compliant.

Specification-based anomaly detection may be utilized to detect one or more of acceleration patterns, braking patterns, original equipment manufacturer (OEM) provided patterns, counterfeit airbags, and invalid bus identifications.

Intrusion detection program 591 may receive calibration information and/or update information via wireless wide area network interface 444 and the wireless local area network interface 446.

Figure 6:
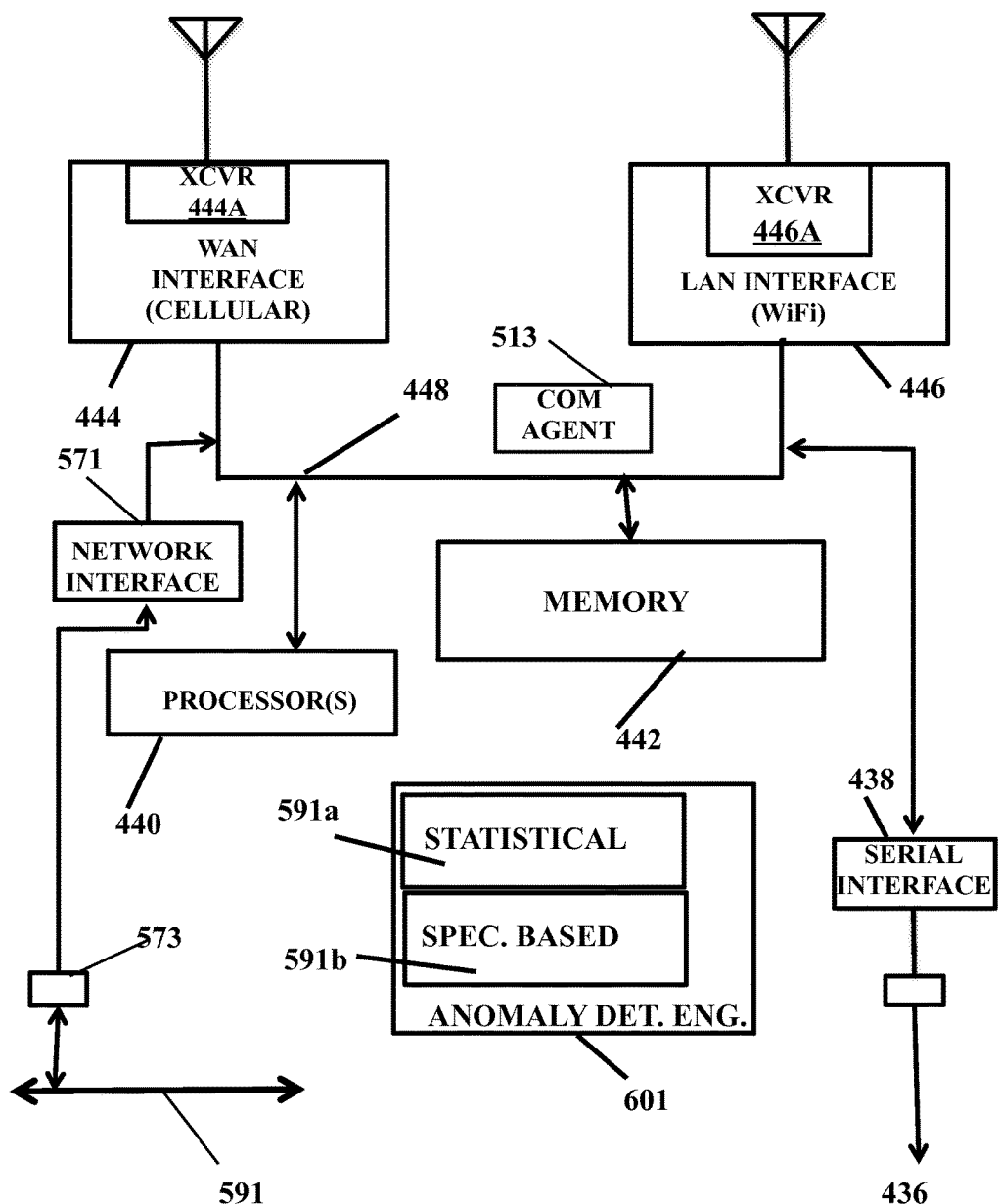
FIG. 6 is a block diagram of a second embodiment of a mobile router.

In the embodiment of FIG. 6, an anomaly detection engine 601 is provided in mobile router 112. Anomaly detection engine 601 may comprise one or both of a statistical anomaly detection program 591a and a specification based anomaly detection program 591b. In addition to the anomalies detected as described above anomaly detection engine 601 may detect one or both of re-flashing of an electronic control unit memory and predetermined radio frequency hub activity in the vehicle. The type of predetermined radio frequency hub activity may include attempts to unlock or access the vehicle by transmitting various radio frequency codes in an attempt to access a predetermined code assigned to the vehicle.

It will be appreciated by those skilled in the art that the various functions of each of the plurality of mobile routers 112 may be integrated directly into a vehicle 101.

Figure 7:
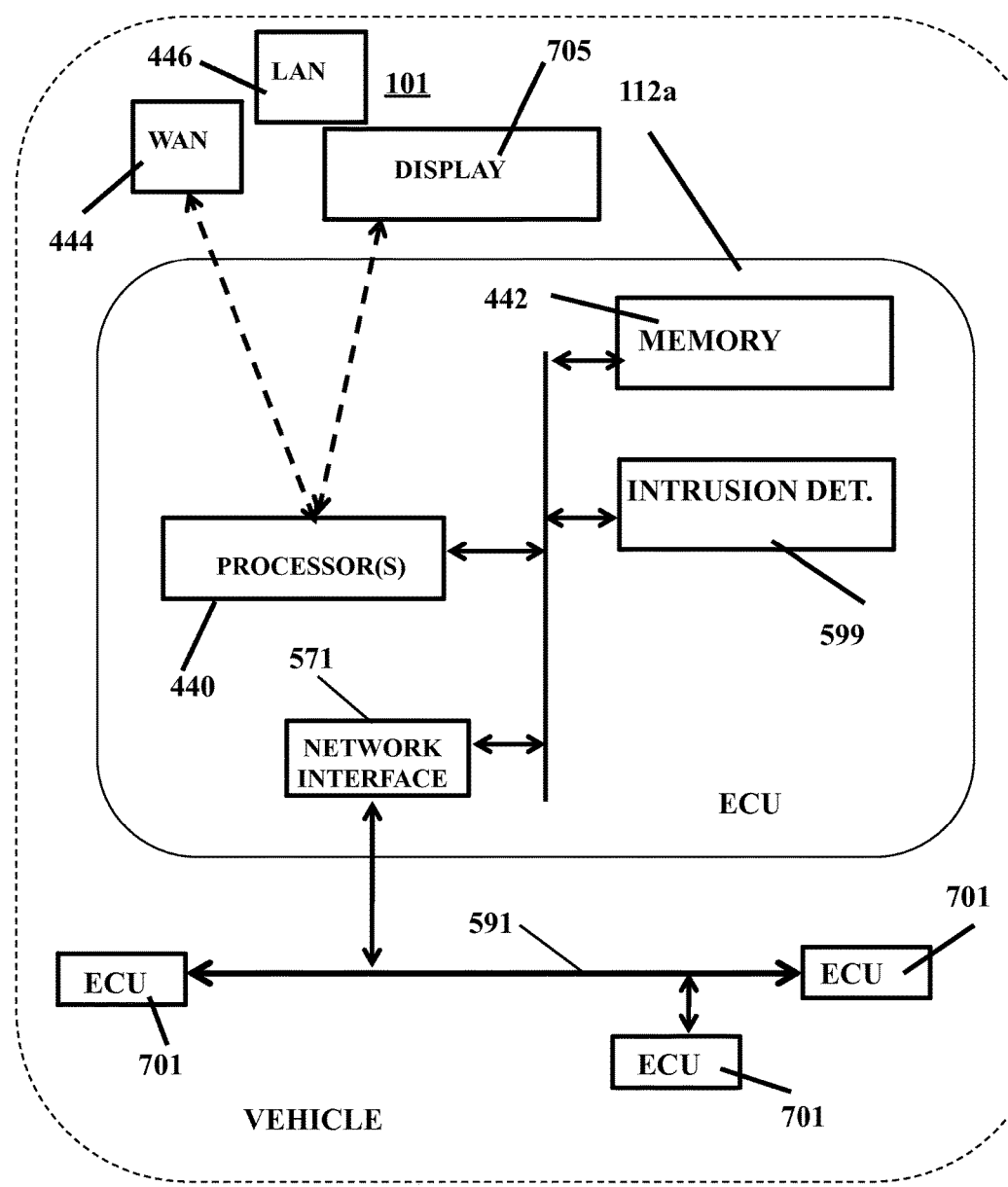
FIG. 7 is a block diagram of a vehicle.

Turning now to FIG. 7, an embodiment of a vehicle 101, comprises vehicle network bus 591 and electronic control units 701 coupled to vehicle network bus 591. One electronic control unit 112a comprises: a processor or microprocessor 440; a memory 442; an interface 571 to vehicle network bus 591; and an intrusion detection program 599 executable by processor 440. Processor 440 utilizes interface 571 to monitor data on vehicle network bus 591 and utilizes intrusion detection program 599 to detect one or more anomalies in the monitored data. Electronic control unit 112a generates an alert upon detection of one or more anomalies. Processor 440 may provide the alert to an in-vehicle man-machine interface such as in-vehicle display 705 or to a mobile device or to a server via a wide area network (WAN) wireless interface 444 or a wireless local area network 446.

As with the mobile router 112 in the embodiment of FIG. 5 intrusion detection program 599 may comprise statistical anomaly detection, and may further comprise Bayes' Law.

The statistical anomaly detection of intrusion detection program 599 of the embodiment of FIG. 7 may utilize a profile of normal data on vehicle network bus 591 based upon learned data. The normal data may comprise one or more of an amount of normal traffic on vehicle network bus 591, identification of normal messages on vehicle network bus 591, identification of normal vehicle device-to-device communication on vehicle network bus 591, and identification of normal sensor data on vehicle network bus 591.

Vehicle network bus 591 may comprise a Controller Area Network (CAN) bus.

Intrusion detection program 599 may further comprise specification based anomaly detection. The intrusion detection program ignores all specification compliant data on the vehicle network bus and generates the alert for data that is not specification compliant.

The specification-based anomaly detection may be utilized to detect one or more of acceleration patterns, braking patterns, original equipment manufacturer (OEM) provided patterns, counterfeit airbags, and invalid bus identifications.

Wireless wide area network interface 444 is operable to receive at least one of calibration information and update information for intrusion detection program 599.

Figure 8:
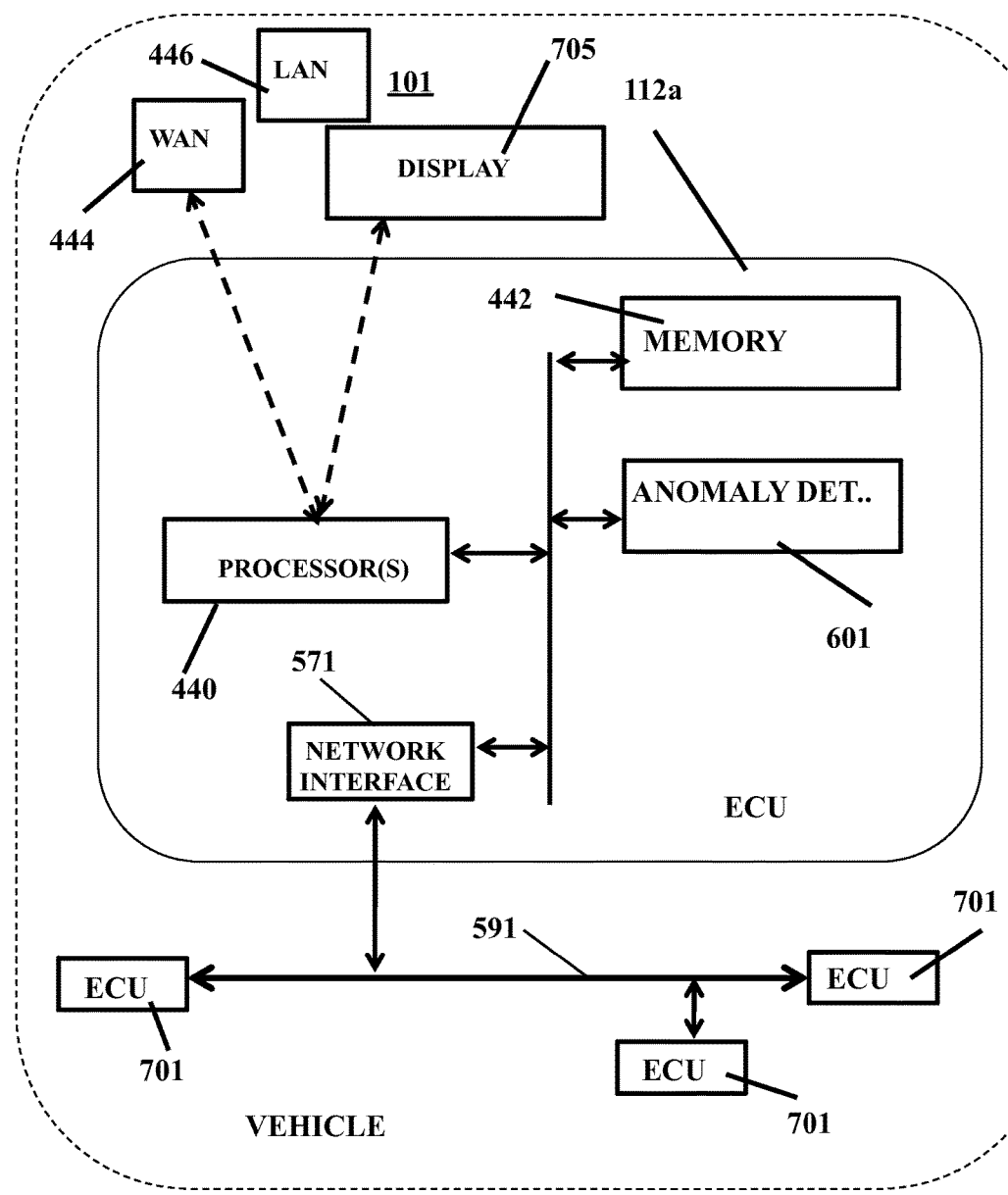
FIG. 8 is a block diagram of a second embodiment of a vehicle.

Vehicle 101 may comprise an anomaly detection engine 601 as shown in FIG. 8. Anomaly detection engine 601 may comprise one of statistical anomaly detection and specification based anomaly detection. Anomalies detected by anomaly detection engine 601 may comprise one of re-flashing of an electronic control unit memory, and predetermined radio frequency hub activity in vehicle 101.

Figure 9:
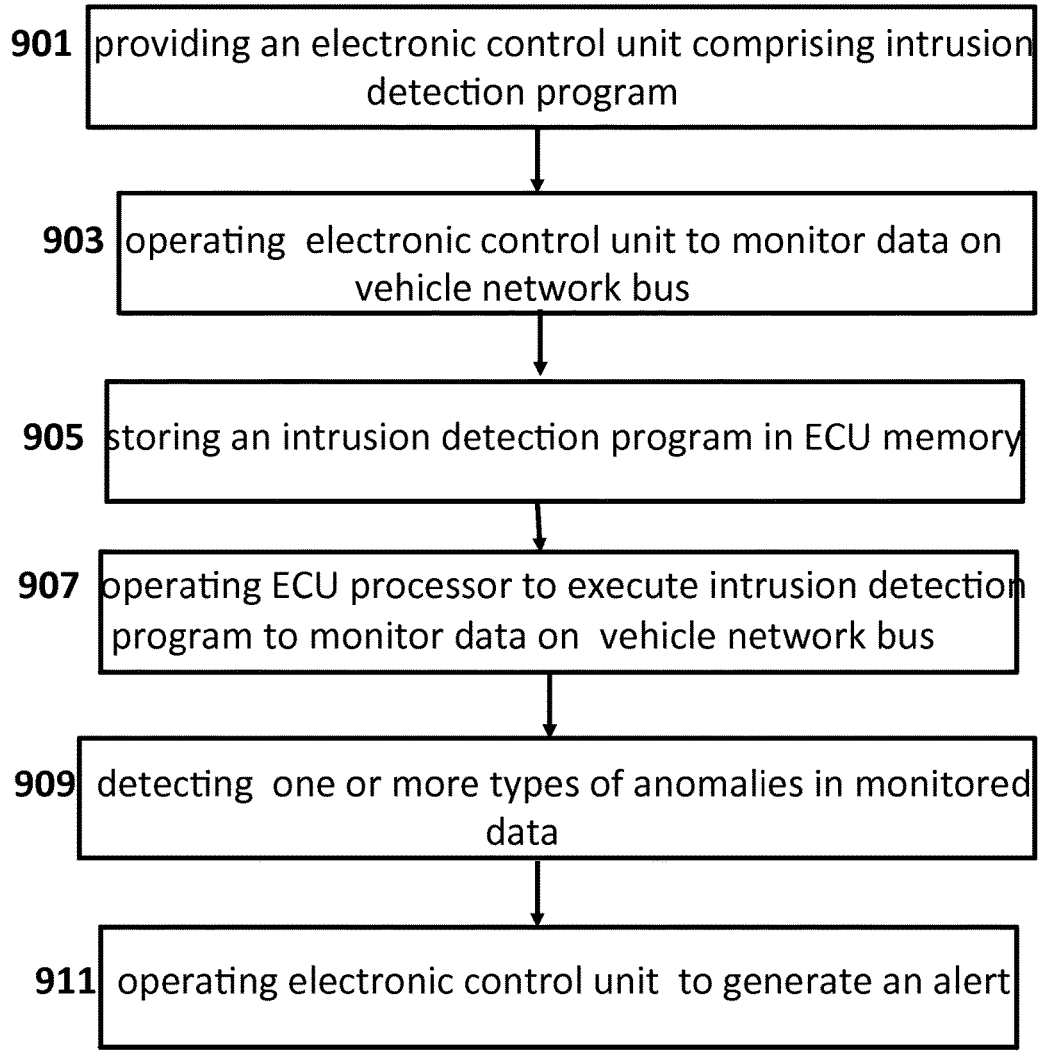
FIG. 9 illustrates method steps of a first method embodiment.

In various embodiments, a method shown in FIG. 9 is provided for vehicle intrusion detection for a vehicle 101 shown in FIG. 7 comprising a vehicle network 591 bus and electronic control units 701 coupled to vehicle network bus 591. The method comprises, at step 901, providing vehicle 101 with one electronic control unit 112a comprising an intrusion detection program. The method further comprises: operating electronic control unit 112 to monitor data on vehicle network bus 591 at step 903; storing an intrusion detection program 599 in memory 442 at step 905; operating processor 440 to execute intrusion detection program 599 to monitor data on the vehicle network bus 591 at step 907; detecting one or more types of anomalies in the monitored data at step 909; and operating electronic control unit 112a to generate an alert upon detection of one or more anomalies at step 911.

The method may further comprise utilizing statistical anomaly detection to detect one or more types of anomalies; and may also comprise utilizing Bayes' Law to detect one or more types of anomalies.

The method may further comprise utilizing a profile of normal data on vehicle network bus 591 based upon learned data for statistical anomaly detection; and may further comprise selecting the normal data to be one or more of an amount of normal traffic, identification of normal messages, identification of normal vehicle device to device communication, and identification of normal sensor data.

The method may further comprise operating electronic control unit 112a to transmit the alert to one of a man-machine interface in the vehicle 705, a mobile device such as a cellular phone or a pad type device or other mobile computing device, and a server.

In other embodiments, the method may comprise utilizing specification based anomaly detection in the intrusion detection program. The method may further comprise: operating the electronic control unit 112a to ignore all specification compliant data on vehicle network bus 591; and generating the alert for data on vehicle network bus 591 that is not specification compliant.

Electronic control unit 112a may have access to a wireless wide area network interface 444 in the vehicle and the method may comprise receiving at least one of calibration information and update information for the intrusion detection program via wireless wide area network interface 444.

The method may further comprise utilizing the specification-based anomaly detection to detect one or more of acceleration patterns, braking patterns, original equipment manufacturer (OEM) provided patterns, counterfeit airbags, spoofing of vehicle bus messages and/or identifications, and invalid bus identifications.

The method may further comprise providing electronic control unit 112a with an anomaly detection engine 601. The method my yet further comprise selecting the anomaly detection engine to comprise one of statistical anomaly detection and specification based anomaly detection.

In embodiments of the method, the anomalies may comprise one of re-flashing of an electronic control unit memory, and predetermined radio frequency hub activity in the vehicle.

Further embodiments of the invention are directed to a method of operating a mobile router 112 installed in a vehicle 101 as shown in FIG. 7. Vehicle 101 comprises a vehicle network bus 591 coupled to a plurality of electronic control units. Mobile router 112 comprises: a wireless wide area network interface 446, a wireless local area network interface 446, an interface 571 to vehicle network bus 591; a processor 440; and a memory 442 comprising a plurality of programs. The plurality of programs comprises an intrusion detection program 599 executable by processor 440.

Figure 10:
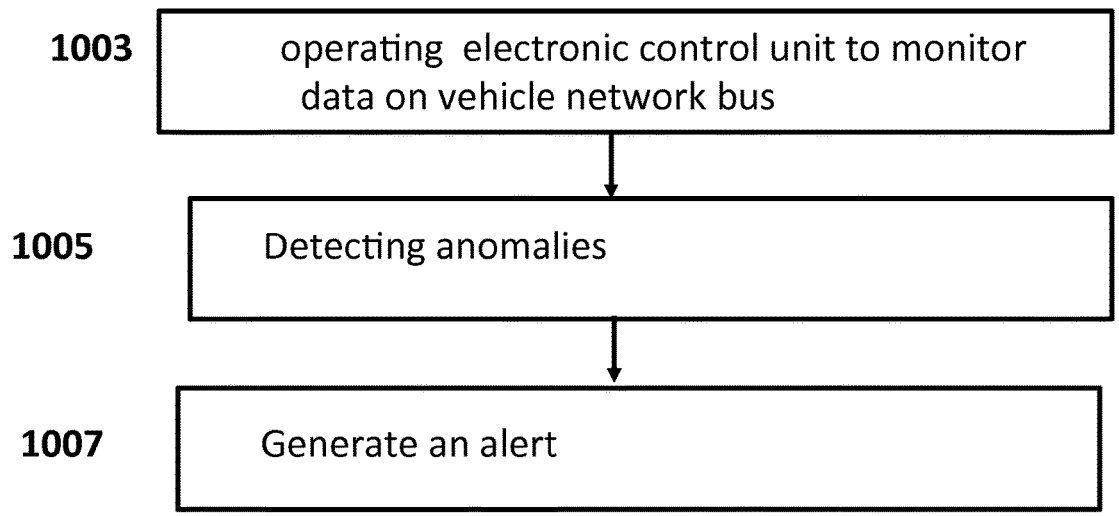
FIG. 10 illustrates method steps of a second method embodiment.

The method of operating mobile router 112 shown in FIG. 10 comprises: monitoring data on vehicle network bus 591 at step 1003; utilizing intrusion detection program 599 to detect one or more anomalies in the monitored data at step 1005; and generating an alert upon detection of one or more of anomalies at step 1007.

The method further may comprise isolating intrusion detection program 599 from the other of the plurality of programs. The method may comprise storing intrusion detection program 599 in a first memory portion 597 and storing the other programs in a second memory portion 595.

The method of operating mobile router 112 may further comprise utilizing statistical anomaly detection in the intrusion detection program. The method may yet further comprise utilizing Bayes' Law.

The method of operating a mobile router 112 may include transmitting the alert to one of a man-machine interface in the vehicle, a mobile device, and a server. The method may further include transmitting the alert via a selected one of wide area network interface 446 and local area network interface 444 to one of a mobile device and a server.

The method of operating a mobile router 112 may further comprise utilizing a profile of normal data on vehicle bus based 591 based upon learned data to detect anomalies. The normal data may comprise one or more of an amount of normal traffic on vehicle network bus 591, identification of normal messages on vehicle network bus 591, identification of normal vehicle device-to-device communication on vehicle network bus 591, and identification of normal sensor data on vehicle network bus 591.

The method of operating mobile router 112 may comprise utilizing specification based anomaly detection in the intrusion detection program, and further may comprise ignoring all specification compliant data on the vehicle network bus 591 and generating an alert for data on that is not specification compliant.

The method of operating mobile router 112 may comprise utilizing specification-based anomaly detection to detect one or more of acceleration patterns, braking patterns, original equipment manufacturer (OEM) provided patterns, counterfeit airbags, and invalid bus identifications. The method may further comprise receiving at least one of calibration information and update information for intrusion detection program 599 via a selected one of wireless wide area network interface 444 and wireless local area network interface 446.

The method of operating mobile router 591 may comprise: providing an anomaly detection engine 601; and utilizing anomaly detection engine 601. The method may further comprise selecting anomaly detection engine 601 to comprise one of statistical anomaly detection and specification based anomaly detection.

The method of operating mobile router 112 may comprise detecting anomalies comprising one of re-flashing of an electronic control unit memory, and predetermined radio frequency hub activity in the vehicle as described hereinabove.

Figure 11:
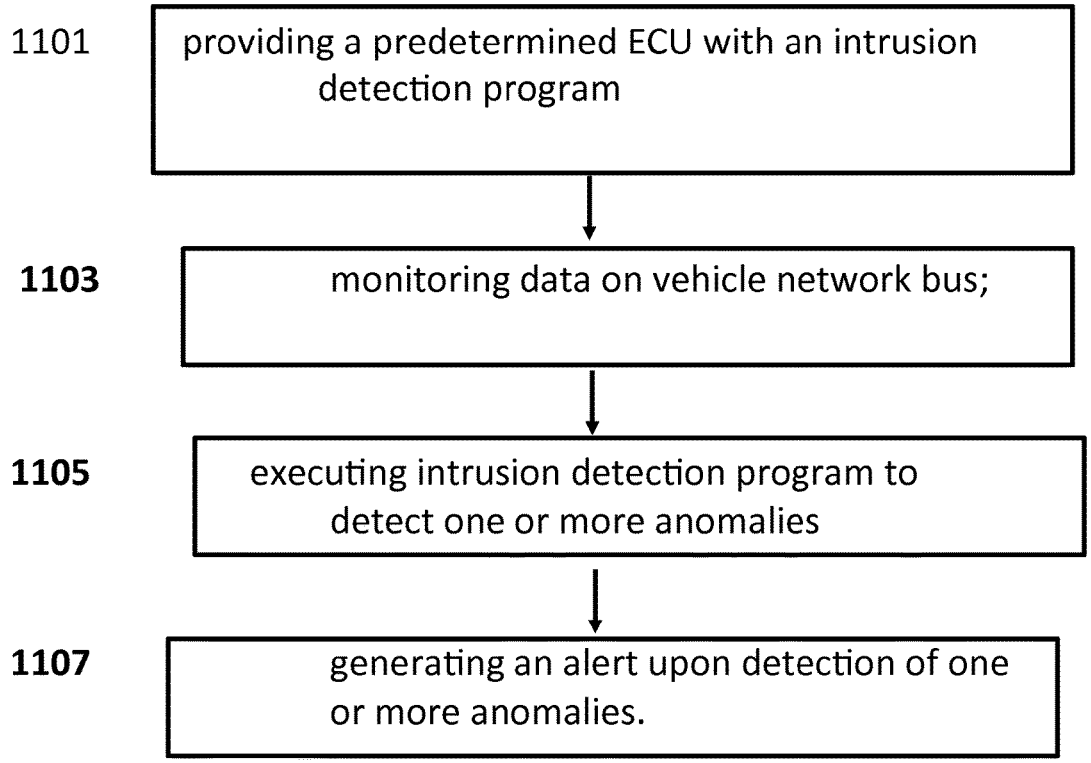
FIG. 11 illustrates method steps of a third method embodiment.

In a further embodiment, a method shown in FIG. 11 is provided for operating a predetermined electronic control unit 112*a* in a vehicle 101 shown in FIG. 8. Vehicle 101 comprises: a vehicle network bus 591 and one or more electronic control units 701 coupled to vehicle network bus 591. The method comprises: providing, at step 1101, vehicle 101 with a predetermined electronic control unit 112*a* comprising: a processor 440; a memory 442; an interface to vehicle network bus 571; and an intrusion detection program 599. In this embodiment, intrusion detection program 599 is stored in memory 442. The method further comprises: utilizing the a predetermined electronic control unit 112*a* to monitor data on the vehicle network bus at step 1103; executing the intrusion detection program to detect one or more anomalies in the monitored data 1105; and utilizing the a predetermined electronic control unit 112*a* to generate an alert upon detection of one or more anomalies 1107.

The method of operating predetermined electronic control unit 112*a* may comprise utilizing statistical anomaly detection in the intrusion detection program.

The method of operating predetermined electronic control unit 112*a* may further comprise utilizing Bayes' Law in the intrusion detection program.

The method of operating predetermined electronic control unit 112*a* may comprise transmitting the alert to one of a man-machine interface in the vehicle, a mobile device, and a server.

The method of operating predetermined electronic control unit 112*a* may comprise transmitting the alert to one of the mobile device and the server via wireless wide area network interface 444.

The method of operating predetermined electronic control unit 112*a* may comprise operating predetermined electronic control unit 112*a* to utilize a profile of normal data on vehicle bus 591, the profile of normal data being based upon learned data. The method may comprise selecting the normal data to comprise one or more of an amount of normal traffic, identification of normal messages, identification of normal vehicle device-to-device communication, and identification of normal sensor data.

The method of operating predetermined electronic control unit 112*a* may comprise providing intrusion detection program 599 with specification based anomaly detection. The method may further comprise executing intrusion detection program 599 to ignore all specification compliant data on the vehicle network bus; and operating the predetermined unit to generate the alert for data on vehicle network bus 591 that is not specification compliant.

The method of operating predetermined electronic control unit 112*a* may comprise operating predetermined electronic control unit 112*a* to receive at least one of calibration information and update information for the intrusion detection program via wireless wide area network interface 444.

The method of operating predetermined electronic control unit 112*a* may comprise utilizing specification-based anomaly detection to detect one or more of acceleration patterns, braking patterns, original equipment manufacturer (OEM) provided patterns, counterfeit airbags, and invalid bus identifications.

The method of operating predetermined electronic control unit 112*a* may comprise providing the predetermined unit with an anomaly detection engine 601. The method may further comprise selecting anomaly detection engine 601 to comprise one of statistical anomaly detection and specification based anomaly detection. The method of operating predetermined electronic control unit 112*a* may comprise selecting the anomalies to comprise one of re-flashing of an electronic control unit memory, and predetermined radio frequency hub activity in vehicle 101.

It will be appreciated by those skilled in the art that various changes and modifications may be made to the embodiments described herein without departing from the spirit or scope of the invention. It is intended that the invention not be limited in any way by the embodiments shown and described herein, but that the invention be limited only by the claims appended hereto.

The invention claimed is:
1. A vehicle comprising:
a vehicle network bus;
a wireless local area network mobile with said vehicle;
a wireless wide area network;
a wireless wide area network interface to access said wireless wide area network;
a wireless local area network interface operable to provide said mobile wireless local area network for one or more mobile devices within said vehicle;
a plurality of electronic control units coupled to said vehicle network bus, each of said electronic control units comprising a separate processor and a separate physical memory;
a predetermined one electronic control unit of said plurality of electronic control units, comprising:
an interface to said vehicle network bus;
said separate processor of said predetermined one electronic control unit utilizing said interface to monitor data on said vehicle network bus;
an intrusion detection program stored in said separate physical memory of said predetermined one electronic control unit, said intrusion detection program being isolated to insure its integrity, said isolation comprising utilizing one or more memory isolation approaches that insure the integrity of said intrusion detection program, said intrusion detection program executable by said separate processor of said predetermined one electronic control unit to detect one or more anomalies indicative of an electronic intrusion;
said separate processor of said predetermined one electronic control unit utilizing said intrusion detection program to detect said one or more anomalies indicative of an electronic intrusion in said monitored data;
said one or more anomalies comprise reflashing of an electronic control unit memory and predetermined radio frequency hub activity in said vehicle of a type that comprises attempts to determine a predetermined code assigned to said vehicle;
said wireless wide area network interface and said wireless local area network interface are selectively oper- able to receive at least one of calibration information and update information for said intrusion detection program; and said predetermined one electronic control unit generating an alert indicative of an electronic intrusion upon detection of said one or more of anomalies indicative of an electronic intrusion.

2. The vehicle in accordance with claim 1, comprising:
said intrusion detection program comprises statistical anomaly detection.

3. The vehicle in accordance with claim 1, comprising:
said intrusion detection program comprises Bayes' Law.

4. The vehicle in accordance with claim 3, comprising:
said predetermined one electronic control unit transmits said alert indicative of an electronic intrusion to one of a display in said vehicle, a mobile device, and a server.

5. The vehicle in accordance with claim 4, wherein:
said predetermined one electronic control unit comprises said wireless wide area network interface; and
said predetermined one electronic control unit transmits said alert to one of said mobile device and said server via said wireless wide area network interface.

6. The vehicle in accordance with claim 4, wherein:
said vehicle network bus comprises a Controller Area Network (CAN) bus.

7. The vehicle in accordance with claim 2, comprising:
said statistical anomaly detection utilizes a profile of normal data on said vehicle bus based upon learned data.

8. The vehicle in accordance with claim 7, comprising:
said normal data comprises one or more of an amount of normal traffic, identification of normal messages, identification of normal vehicle device to device communication, and identification of normal sensor data.

9. The vehicle in accordance with claim 1, comprising:
said intrusion detection program comprises specification based anomaly detection.

10. The vehicle in accordance with claim 9, comprising:
said intrusion detection program ignores all specification compliant data on said vehicle network bus and generates said alert for data on said vehicle network bus that is not specification compliant.

11. The vehicle in accordance with claim 10, comprising:
said predetermined one electronic control unit transmits said alert indicative of an electronic intrusion to one of a display in said vehicle, a mobile device, and a server.

12. The vehicle in accordance with claim 11, wherein:
said vehicle network bus comprises a Controller Area Network (CAN) bus.

13. The vehicle in accordance with claim 9, comprising:
said specification-based anomaly detection is utilized to detect one or more of acceleration patterns, braking patterns, original equipment manufacturer (OEM) provided patterns, counterfeit airbags, and invalid bus identifications.

14. The vehicle in accordance with claim 1, comprising:
providing said intrusion detection program with an anomaly detection engine.

15. The vehicle in accordance with claim 14, comprising:
said anomaly detection engine comprises one of statistical anomaly detection and specification based anomaly detection.

16. The vehicle in accordance with claim 1, comprising:
said predetermined one electronic control unit transmits said alert to one of a display in said vehicle, a mobile device, and a server.

17. The vehicle in accordance with claim 1, wherein:
said vehicle network bus comprises a Controller Area Network (CAN) bus.

* * * * *